US012574160B2

(12) United States Patent
Chang et al.

(10) Patent No.: US 12,574,160 B2
(45) Date of Patent: Mar. 10, 2026

(54) HYBRID AUTOMATIC REPEAT REQUEST (HARQ) FEEDBACK MANAGEMENT BASED ON LOCATION INFORMATION AVAILABILITY FOR GROUP SIDELINK COMMUNICATION

(71) Applicants: Henry Chang, San Diego, CA (US);
Amit Kalhan, San Diego, CA (US);
Masato Fujishiro, Yokohama (JP);
Kyocera Corporation, Kyoto (JP)

(72) Inventors: Henry Chang, San Diego, CA (US);
Amit Kalhan, San Diego, CA (US);
Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 486 days.

(21) Appl. No.: 17/921,436

(22) PCT Filed: May 11, 2021

(86) PCT No.: PCT/US2021/031745
§ 371 (c)(1),
(2) Date: Oct. 26, 2022

(87) PCT Pub. No.: WO2021/236373
PCT Pub. Date: Nov. 25, 2021

(65) Prior Publication Data
US 2023/0163898 A1 May 25, 2023

Related U.S. Application Data

(60) Provisional application No. 63/028,348, filed on May 21, 2020.

(51) Int. Cl.
| | |
|---|---|
| *H04L 1/1812* | (2023.01) |
| *H04L 1/1829* | (2023.01) |
| *H04L 5/00* | (2006.01) |
| *H04W 4/08* | (2009.01) |
| *H04W 64/00* | (2009.01) |
| *H04W 72/542* | (2023.01) |
| *H04W 92/18* | (2009.01) |

(52) U.S. Cl.
CPC .......... *H04L 1/1812* (2013.01); *H04L 1/1864* (2013.01); *H04L 5/0092* (2013.01);
(Continued)

(58) Field of Classification Search
CPC ... H04L 1/1812; H04L 1/1864; H04L 5/0092; H04L 5/0055; H04L 5/0091; H04L 67/12;
(Continued)

(56) References Cited

U.S. PATENT DOCUMENTS

| | | | | |
|---|---|---|---|---|
| 1,217,165 | A | * | 2/1917 | Fessenden ............... F24S 20/20 |
| | | | | 60/641.8 |
| 2020/0351981 | A1 | | 11/2020 | Kang et al. |

(Continued)

FOREIGN PATENT DOCUMENTS

WO    WO-2020088648 A1 *  5/2020  ........... H04B 7/0626

OTHER PUBLICATIONS

Spreadtrum Communications; "Discussion on communication range in V2X," R2-1912233; 3GPP TSG-RAN WG2 Meeting #107bis; Oct. 1, 2019; Chongqing, CN.
(Continued)

*Primary Examiner* — Dady Chery

(57) ABSTRACT

A receiving user equipment (UE) device sends a location unavailable notification to a transmitting UE device indicating that location information is unavailable. The receiving UE device is one of a group of UE devices receiving a groupcast data transmission from the transmitting UE device where the groupcast data transmission comprises a distance-based hybrid automatic repeat request (HARQ) feedback configuration. The receiving UE determines that location information is unavailable and sends the location unavailable notification. The location unavailable notification may be a broadcast message or message send over unicast communication link.

22 Claims, 9 Drawing Sheets

(52) U.S. Cl.
CPC ............. *H04W 4/08* (2013.01); *H04W 64/00* (2013.01); *H04W 72/542* (2023.01); *H04W 92/18* (2013.01)

(58) Field of Classification Search
CPC ............ H04L 2001/0093; H04W 4/08; H04W 64/00; H04W 72/542; H04W 92/18; H04W 4/40; H04W 4/06
See application file for complete search history.

(56) References Cited

U.S. PATENT DOCUMENTS

| | | | |
|---|---|---|---|
| 2022/0103292 A1* | 3/2022 | Hwang | ................. H04L 1/1812 |
| 2022/0116996 A1 | 4/2022 | Lee et al. | |

OTHER PUBLICATIONS

Ericsson; "On the use of communication range at AS," R2-1910309; 3GPP TSG-RAN WG2 Meeting #107; Aug. 15, 2019; Prague, CZ.

Apple; "On Remaining Details of Physical Layer Procedures for NR V2X Sidelink," R1-2002327; 3GPP TSG RAN WG1 Meeting #100bis; Apr. 11, 2020; Sophia Antipolis Cedex, FR.

ZTE, Sanechips; "Remaining issues on PHY procedures for Rel-16 sidelink," R1-2001898; 3GPP TSG RAN WG1 Meeting #100bis-e; Apr. 11, 2020; Sophia Antipolis Cedex, FR.

LG Electronics Inc. (Rapporteur); "Report of [Post109e#21][V2X] Remaining MAC issues (LG)," R1-2003522; 3GPP TSG RAN WG2 Meeting #109B-e; Apr. 17, 2020; Sophia Antipolis Cedex, FR.

* cited by examiner

HYBRID AUTOMATIC REPEAT REQUEST (HARQ) FEEDBACK MANAGEMENT BASED ON LOCATION INFORMATION AVAILABILITY FOR GROUP SIDELINK COMMUNICATION

CLAIM OF PRIORITY

The present application claims the benefit of priority to Provisional Application No. 63/028,348 entitled "Groupcast Sidelink HARQ Feedback With No Location Information", filed May 21, 2020, assigned to the assignee hereof and hereby expressly incorporated by reference in its entirety.

FIELD

This invention generally relates to wireless communications and more particularly to hybrid automatic repeat request (HARQ) feedback management based on location information availability for group sidelink communication.

CROSS REFERENCE TO RELATED APPLICATIONS

This application is related to U.S. application Ser. No. 17/921,452, which is a national stage application of PCT/US2021/081752, entitled "DISTANCE-BASED HYBRID AUTOMATIC REPEAT REQUEST (HARQ) LOCATION UNAVAILABLE CONFIGURATION FOR GROUP SIDE-LINK COMMUNICATION", and U.S. application Ser. No. 17/921,464, which is a national stage application of PCT/US2021/031756, entitled "HYBRID AUTOMATIC REPEAT REQUEST (HARQ) FEEDBACK MANAGE-MENT BASED ON LOCATION INFORMATION AVAIL-ABILITY AND SIDELINK SIGNAL QUALITY FOR GROUP SIDELINK COMMUNICATION", both filed con-currently with this application and incorporated by reference in their entirety herein.

BACKGROUND

Many wireless communication systems that employ several base stations that provide wireless service to user equipment (UE) devices enable sidelink communication between two or more UE devices where the UE devices can communicate directly with other UE devices. Such sidelink communications sometimes include one UE device (group leader UE device) that transmits the same data to multiple UE devices in a group. Different transmission techniques often referred to as cast types can be used to transmit the same data to multiple UE devices. Cast types include at least unicast, groupcast and broadcast. A unicast transmission can only be received by the single UE device that is the intended recipient of the data. Accordingly, multiple transmissions are required to send the same data to multiple UE devices using unicast. A broadcast transmission can typically be received by all UE devices within range of the transmission. A groupcast transmission can only be received by the UE devices that are members of a group. Accordingly, for example, the group leader UE device can transmit the same data in a single transmission using groupcast to two or more UE devices in the group or can send the same data in multiple unicast transmissions to the UE devices.

SUMMARY

A receiving user equipment (UE) device sends a location unavailable notification to a transmitting UE device indicating that location information is unavailable. The receiving UE device is one of a group of UE devices receiving a groupcast data transmission from the transmitting UE device where the groupcast data transmission comprises a distance-based hybrid automatic repeat request (HARQ) feedback configuration. The receiving UE determines that location information is unavailable and sends the location unavail-able notification. The location unavailable notification may be a broadcast message or message sent over a unicast communication link.

DETAILED DESCRIPTION

Figure 1:
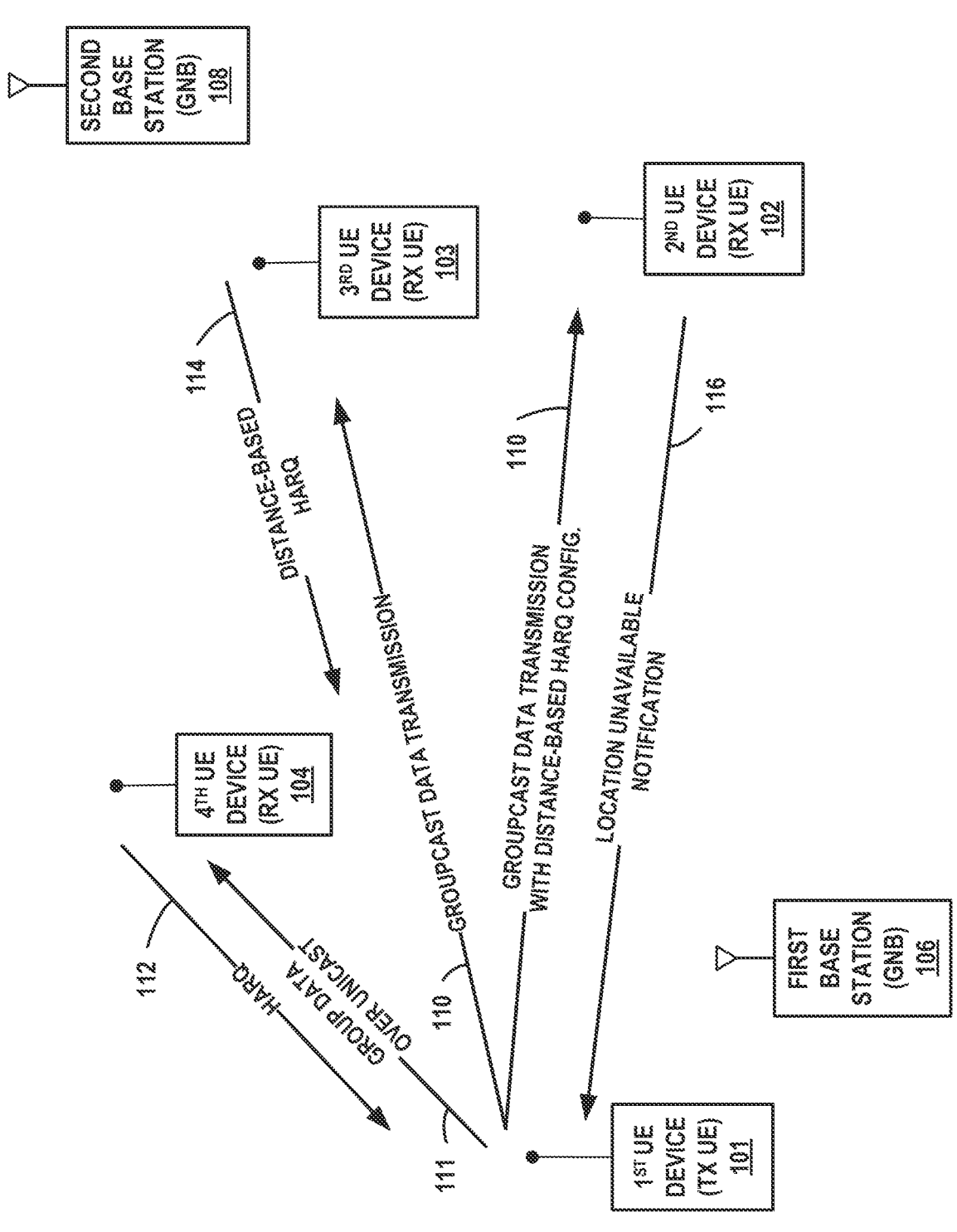
FIG. 1 is a block diagram of an example of a communi-cation system including a first user equipment (UE) device, a second UE device, a third UE device, a fourth UE device, and two base stations.

As discussed above, different cast types can be used for communication between UE devices. Although UE device groups may be formed and used in different situations and environments, one scenario where grouping UE devices is particularly useful includes vehicle platoons where vehicles dynamically form a platoon while travelling together. All the vehicles in the platoon obtain information from the leading vehicle to manage the platoon. In some implementations, the information facilitates travel of the vehicles in the same direction in a coordinated manner and allows the vehicles to drive closer than in normal situations where there is no communication between the vehicles. Vehicles of the same platoon are involved in sharing the necessary information required to support the platoon operations where the infor-mation may include, for example, the distance between vehicles, relative speeds, and updates from roadside units (RSUs). Similar requirements also apply to the Extended Sensor use case where UE devices exchange data gathered through local sensors or live video data among vehicles, RSUs, pedestrian devices, and V2X application servers. Groupcast techniques allow efficient transmission of the information from one UE device, such as the platoon leader, to the other UE device members of the group.

In accordance with revisions of 3GPP communication specifications, sidelink communications between a transmitting UE device and receiving UE device(s) are managed with feedback messaging. In order to achieve reliable communications, for example, both unicast and groupcast communications support hybrid automatic repeat request (HARQ) feedback over sidelink in order for the transmitting UE device to determine if retransmissions are needed and if the modulation code scheme (MCS) needs to be relaxed to provide a more robust retransmission to reach the receiving peer UE device. With unicast transmissions, HARQ feedback for both acknowledgement (ACK) and negative acknowledgement (NACK) are supported and addressed to a single peer UE device. With groupcast transmissions, however, the transmitting UE device configures HARQ feedback which may include ACK/NACK feedback or only NACK feedback. The transmitting UE device of the groupcast transmission my receive HARQ feedback from multiple peer UE devices on the Physical Sidelink Feedback Channel (PSFCH). In order to save HARQ feedback resources on the PSFCH, the feedback for groupcast may be configured by the transmitting UE device for two general configurations. For a first configuration, the receiving UE device transmits HARQ-NACK on PSFCH if it fails to decode the corresponding transport block (TB) after decoding the associated PSCCH. With the first configuration, the receiving UE device transmits no signal on PSFCH otherwise. With a second configuration, the receiving UE device transmits HARQ-ACK on PSFCH if it successfully decodes the corresponding TB and it transmits HARQ-NACK on PSFCH if it does not successfully decode the corresponding TB after decoding the associated PSCCH targeting the receiving UE device.

More specifically, when the transmitting UE device transmits data to group member receiving UE devices, the packet consists of both the traffic data and the header including Sidelink Control Info (SCI). The SCI is encoded with a more robust modulation coding scheme (MCS) than the data so that the receiving UE devices will more easily receive this portion of the signal. The traffic portion of the packet is encoded with a relatively less robust MCS to ensure higher data throughput. Therefore, if the receiving UE device only successfully receives the control signal portion (SCI) without successfully receiving the data portion, the receiving UE device sends a "NACK" to the transmitting UE device. For the option where both ACK and NACK are required for feedback, the receiving UE device is required to send ACK when the data portion is received successfully. When the receiving UE device cannot decode the SCI the receiving UE device does not send either ACK nor NACK. Such a situation corresponds to the HARQ DTX case where the transmitting UE device determines that the receiving UE device did not receive the packet if no feedback is received within a HARQ feedback timer.

In addition, the transmitting UE device may enable distance-based HARQ feedback. With distance-based HARQ feedback, the receiving UE device sends HARQ feedback only if the receiving UE device is within a configured communication range away from the transmitting UE device. Typically, distance-based HARQ requires NACK only feedback. For conventional systems, the transmitting UE device indicates its current Zone ID and a communication range requirement in the Sidelink Control Info (SCI). The receiving UE device calculates the distance from the current location of the receiving UE device to the center of that particular Zone ID indicated in the SCI received from the transmitting UE device. If the distance is less than the communication range requirement, the receiving UE device sends the NACK for HARQ feedback. Therefore, when distance-based HARQ is configured, the receiving UE devices that are far away from the transmitting UE device do not send HARQ feedback. Such a configuration not only reduces the use of PSFCH resources, but it prevents the transmitting UE device from making unnecessary retransmissions where a NACK is received since the retransmission will likely not be successfully received by those far away receiving UE devices.

In some situations, location information is not available to a UE device. Typically, such a situation is temporary rather than an issue with the capability of the UE device. In most situations where the transmitting UE device does not have its own location information, the transmitting UE device will not configure distance-based HARQ feedback of the receiving UE devices of the group.

An issue arises when the transmitting UE device has location information and configures distance-based HARQ feedback for groupcast transmissions, but location information is unavailable to one or more of the receiving UE devices. In this case, the receiving UE device cannot determine if it is within communication range and whether HARQ feedback should be sent.

One possible mechanism to address this problem is to require any receiving UE device that does not have location information to refrain from sending HARQ feedback if distance-based HARQ feedback is configured. Such a technique has the benefit that PSFCH resources can be saved for other UE devices and useless retransmissions may be avoided. In some situations, however, the receiving UE device may be well within the communication range but HARQ feedback cannot be sent. An example of such a situation occurs when the receiving UE device passes through a coverage hole. As a result, the service performance may be unnecessarily severely degraded by restricting HARQ feedback even though the receiving UE device is within communication range of the transmitting UE device.

Another possible way to address the problem is to require that receiving UE devices to always send HARQ even when they do not have location information and distance-based HARQ feedback is configured. Such a technique is of course beneficial from the preserving the QoS, especially for high priority service. The technique, however, may result in increased use of PSFCH resources and unnecessary retransmissions, especially where the receiving UE devices are outside the communication range and the data portion of the retransmissions is not likely to be received successfully. Such situations could render the HARQ feedback system unusable.

Therefore, distance-based HARQ feedback management is needed for efficient transmission of HARQ feedback when location information is unavailable to a receiving UE device. For the distance-based HARQ feedback management techniques discussed herein, the receiving UE device informs the transmitting UE device when location information is unavailable to the receiving UE device. In one example, the receiving UE device broadcasts a message to the transmitting UE device indicating that location information is unavailable. In another example, a unicast connection is established and the receiving UE device sends a message over the unicast connection to inform the transmitting UE device that location information is unavailable. In some situations, a unicast connection replaces the groupcast connection where the location information is unavailable to the receiving UE device.

FIG. 1 is a block diagram of an example of a communication system 100 including a first user equipment (UE) device 101, a second UE device 102, a third UE device 103, a fourth UE device 104, and two base stations 106, 108. Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (Rel-17). For the example, the UE devices 101-104 may be any type of device that can receive signals from, and transmit signals to, base stations and other UE devices. The UE devices operate in the communication system that includes a plurality of base stations that each provide wireless service within a service area. For the example of FIG. 1, the first UE device 101 is served by a first base station 106 and the other UE device 102-104 are served by either the first base station 106 or a second base station 108 and may transition between base stations in accordance with known handover techniques. Each of the UE devices 101-104, therefore, may be served by a different base station even though two or more UE devices are communicating with each other using a sidelink connection.

For the example, the first UE device 101 is a transmitting UE device and the other UE devices 102-104 are receiving UE devices and are members of a group. The group data for the group may be transmitted in groupcast transmissions from the transmitting UE device 101. In some situations, the group data may be transmitted over a unicast communication link to a member of the group. For the example, a groupcast transmission 110 including groupcast data is transmitted from the first UE device (transmitting UE device) 101 to the second UE device 102 and the third UE device 103. The group data is also sent over a unicast communication link to the fourth UE device 104. The first UE device 101, therefore, may also be referred to as the transmitting UE device and source UE device, herein. Although the example includes three UE devices 102, 103, 104 in the group, the group may include any number of devices.

For the example of FIG. 1, the fourth UE device 104 receives the group data in a unicast transmission 111 over unicast communication link and therefore provides HARQ feedback in accordance with the unicast connection. The second UE device 102 and the third UE device 103 are sent the group data over a groupcast data transmission specifying a distance-based HARQ feedback. For the example, the third UE device 103 is in a situation where distance based HARQ is invoked. More specifically, location information is available to the third UE device 103, the third UE device determines it is within the specified communication range, and the third UE device is unable to successfully receive the data portion of the groupcast data transmission 110. As a result, the third UE device 103 transmits a distance-based HARQ NACK message 114 in accordance with the distance-based HARQ configuration established by the transmitting UE device 101. The HARQ messages 112, 114 are transmitted over the PSFCH in accordance with known techniques.

The second UE device 102, however, does not successfully receive the data portion of the groupcast data transmission but does not have location information in the example. After receiving the SCI in the groupcast data transmission 110 and determining that the data portion could not be successfully received, the second UE device 102 notifies the first UE device 101 that location information is unavailable. For the example, a location information unavailable notification 116 is transmitted to the first UE device 101. In one example, as discussed below in further detail, the location information unavailable notification 116 is a message that is transmitted using broadcast techniques. In another example, the notification 116 is transmitted over a unicast communication link.

Figure 2:
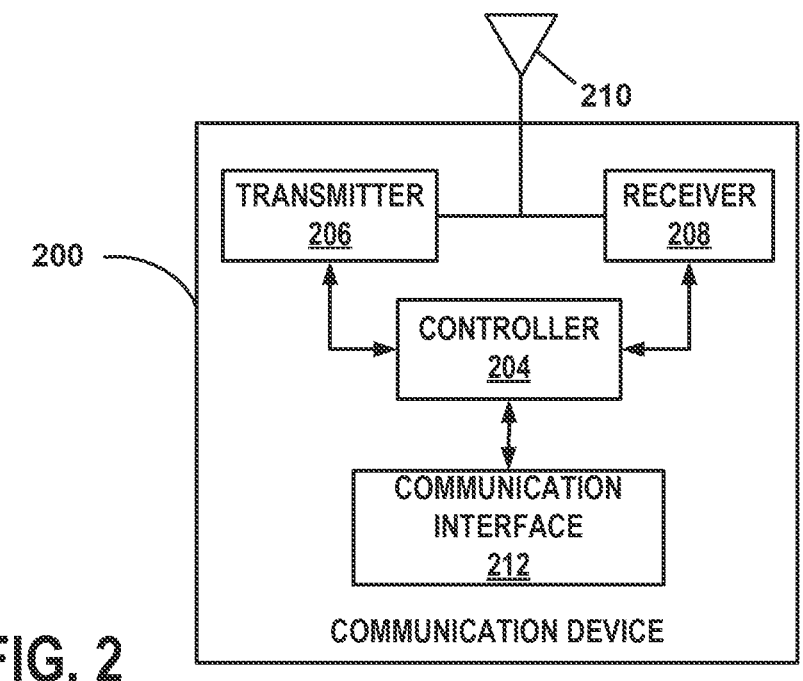
FIG. 2 is a block diagram of an example of a communi-cation device suitable for use as each of the base stations.

FIG. 2 is a block diagram of an example of a base station 200 suitable for use as each of the base stations 106, 108. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 102, 104 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
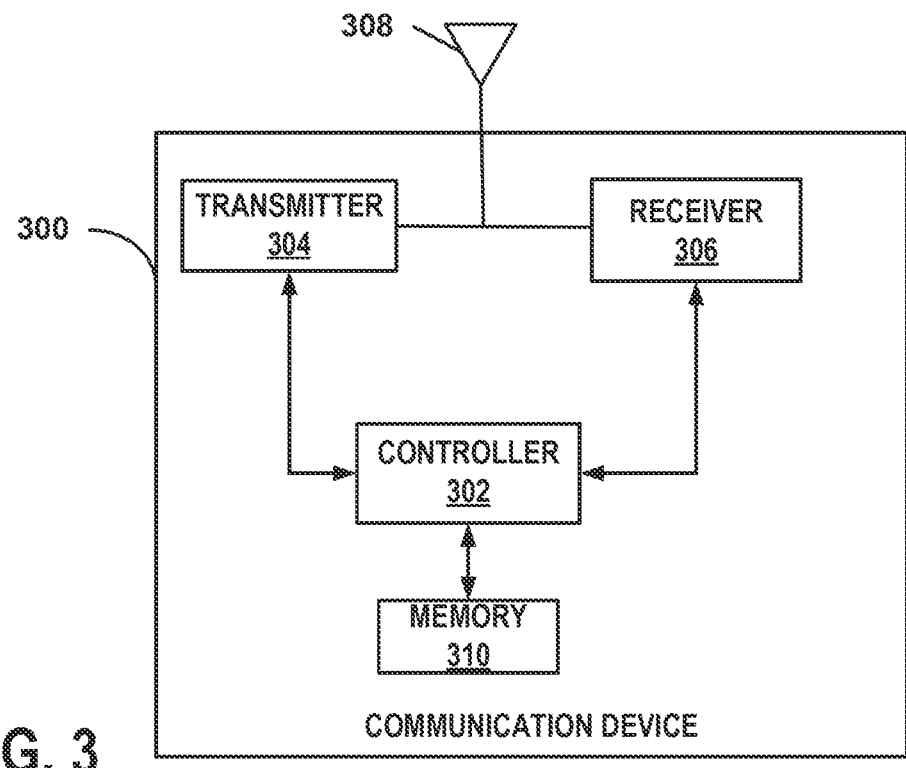
FIG. 3 is a block diagram of an example of a UE device suitable for use as each of the UE devices.

FIG. 3 is a block diagram of an example of a UE device 300 suitable for use as each of the UE devices 101-104. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
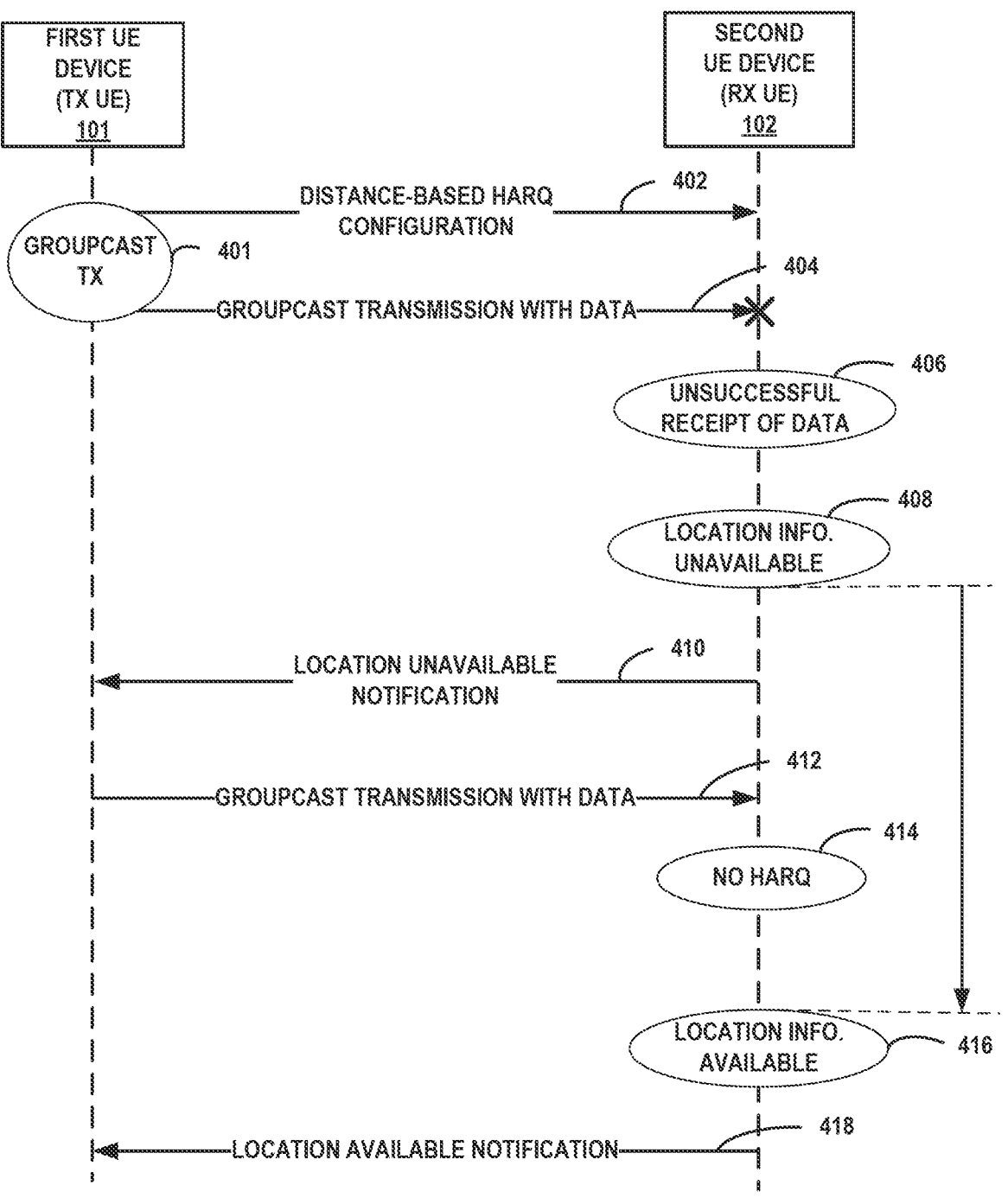
FIG. 4 is a message flow diagram for an example where a receiving UE device provides a location unavailable notification to a transmitting UE device.

FIG. 4 is a message flow diagram 400 for an example where a receiving UE device 102 provides a location unavailable notification 116 to a transmitting UE device 101.

At event 401, a groupcast transmission is transmitted from the transmitting UE device 101 to the receiving UE devices of the group. At transmission 402, the transmitting UE device 101 sends a distance-based HARQ configuration to the receiving UE device 102 to configure the receiving UE device for distance-based HARQ. At transmission 404, a groupcast transmission is sent by the transmitting UE device to the members of the group. The groupcast transmission includes data and the associated SCI. For the examples herein, the distance-based HARQ configuration is sent in the header of a groupcast data transmission. More specifically, the HARQ configuration is sent in the SCI of the groupcast transmission. As discussed above, the SCI is encoded with more robust modulation coding scheme (MCS) than the data so that the receiving UE devices will receive this portion of the signal with a much greater success rate. The traffic portion of the packet might be encoded with a lesser robust MCS to ensure higher data throughput. Accordingly, for the examples herein, transmission 402 and transmission 404 are part of the same transmission at event 401. The two transmissions 402, 404 are shown as separate arrows in the figures to illustrate that the SCI can be successfully received while the data may not be successfully received in some situations. For the examples, the SCI portion of transmission 402 is successfully received and the data in 404 is not successfully received by the receiving UE device 102. In some situations, information related to the HARQ configuration is transmitted over multiple channels. For example, in at least one revision of the NR V2X communication specification, the SCI is sent in two stages where a first part is carried by the physical channel PSCCH and the second part is carried in PSSCH. As specified in Rel-16, one of the fields in the first stage SCI in PSCCH indicates which 2nd-stage SCI (format A or B) is used and a second stage SCI is in the PSSCH indicates either format-2A for HARQ ACK/NACK and format-2B for NACK-only. The zone ID and communication range requirement is sent in the 2B. Accordingly, the transmitting UE device could implicitly request the receiving UE device to send a distance-based HARQ by indicating the groupcast type in the SCI.

At event 406, the receiving UE device 102 determines data in the transmission 404 was not successfully received. After successfully receiving the SCI portion of the groupcast transmission, the receiving UE device 102 unsuccessfully attempts to receive the data portion.

At event 408, the receiving UE device 102 determines that location information is unavailable. For example, the receiving UE device 102 may determine that GPS service is unavailable where GPS provides the information required for the UE device to determine UE device location. In some situations, the location determination is performed at a location server at the base station with assistance from the UE device. If the UE device determines that the base station cannot provide the location information where this technique is used, the receiving UE device determines that location information is unavailable.

At transmission 410, the receiving UE device 102 sends a location unavailable notification. Therefore, transmission 410 is an example of the location unavailable notification 116 of FIG. 1. As discussed below, the location unavailable notification may be a message that is broadcast, may be a message transmitted over a temporarily established PC5-RRC link (unicast communication link), or may be a message transmitted over a PC5-RRC link (unicast communication link) replacing the groupcast link. For the example of FIG. 4, therefore, the receiving UE device 102 does not send HARQ feedback when location information is unavailable. In addition to notifying the transmitting UE device that location information is unavailable to the receiving UE device, the location unavailable notification indicates to the transmitting UE device 101 that the receiving UE device will not be transmitting HARQ feedback for the example.

At transmission 412, another groupcast transmission including data is transmitted to the group from the transmitting UE device. For the example, the receiving UE device is unable to receive the data. At event 414, however, the receiving UE device 102 refrains from sending HARQ since location information is still unavailable. For the example, the receiving UE device 102 does not send another location unavailable notification since the transmitting UE device 101 has already been notified. In some circumstances, however, the notification can be sent.

At event 416, the receiving UE device 102 determines that location information is available. For the example, the receiving UE device 102 sends a location available indication to the transmitting UE device 101. In one example, a message is broadcast to the transmitting UE device. Other techniques may be used to notify the transmitting UE device 101 that the receiving UE device 102 is now able to determine its location. In some situations, the receiving UE device 102 may omit the location available notification 418 and begin sending HARQ feedback when location information becomes available. In other situations, the location unavailable notification 116 starts a timer where expiration of the timer without further notification from the receiving UE device indicates that location information has become available to the receiving UE device 102. The timer value may be fixed or configurable. For one example where the timer value is configurable, the receiving UE device provides the timer value with the location unavailable notification.

Figure 5:
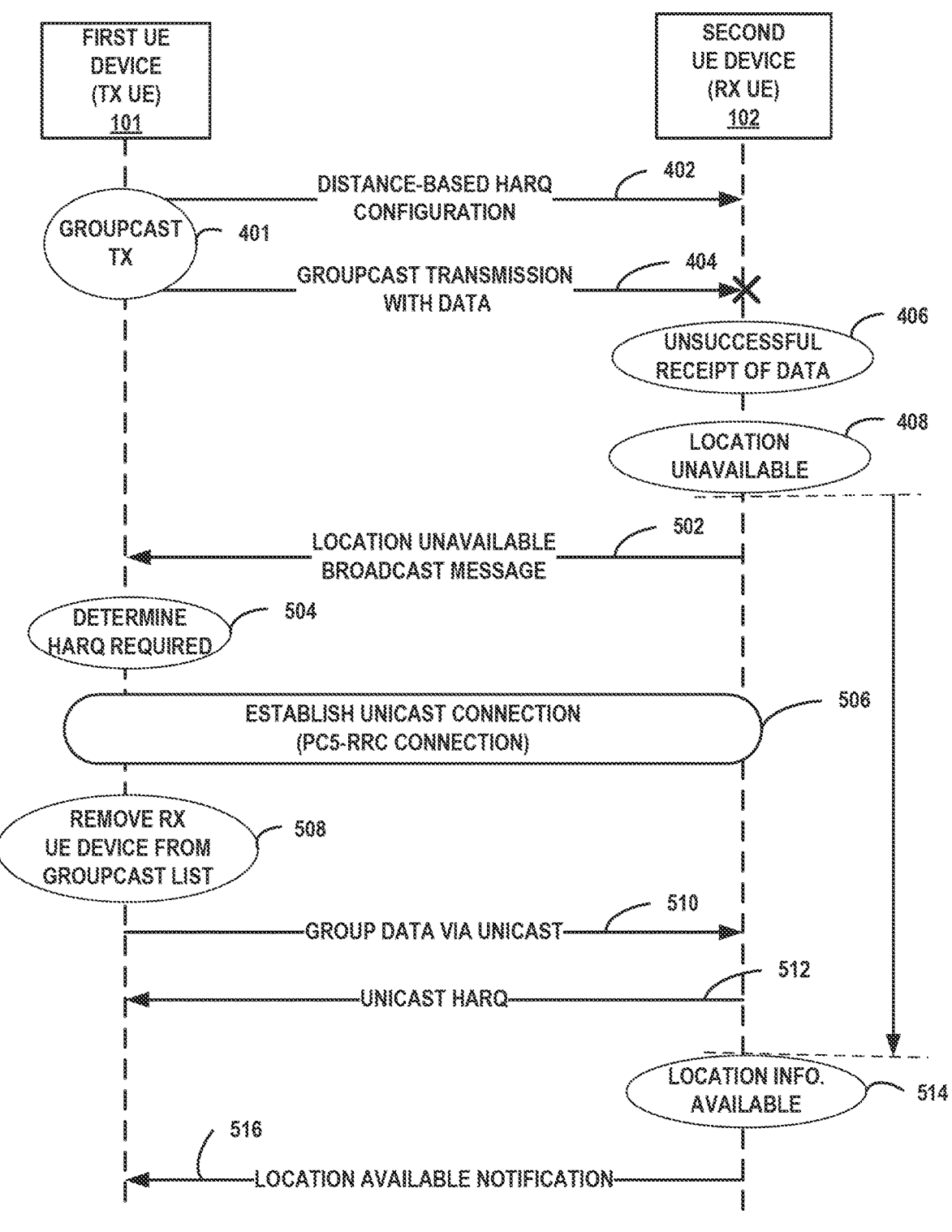
FIG. 5 is a message flow diagram for an example where a receiving UE device provides a location unavailable notification to a transmitting UE device by broadcasting a message and the transmitting UE device establishes a uni-cast connection.

FIG. 5 is a message flow diagram 500 for an example where a receiving UE device 102 provides a location unavailable notification 116 to a transmitting UE device 101 by broadcasting a message and the transmitting UE device 101 establishes a unicast connection. The message flow discussed with reference to FIG. 5 is an example of the message flow discussed with reference to FIG. 4. Event 401, transmission 402, transmission 404, event 406 and event 408 are performed as discussed above with reference to FIG. 4.

At transmission 502, the receiving UE device 102 notifies the transmitting UE device that location information is unavailable by transmitting a broadcast message. In at least one example, the broadcast message includes an SCI field that indicates the message is broadcast message and includes the destination ID of the transmitting UE device. The content of the broadcast message includes the location unavailable notification. In some situations, the location unavailable notification may be provided in the MAC header of the broadcast message. As is known, broadcast messages do not require HARQ feedback.

At event 504, it is determined that HARQ feedback be used for the group transmissions to the receiving UE device. In some situations, the transmitting UE device autonomously determines whether HARQ should be used. In other situations, the base station (gNB) serving the transmitting UE device determines whether HARQ should be used. In still other situations, the decision is made by the network. The decision can also be made collaboratively by more than one entity. The determination on whether HARQ is needed is based at least partially on the quality of service (QOS) required for the communication to the receiving UE device. A higher level QoS, for example, may warrant HARQ feedback while HARQ may not be appropriate for lower level QoS transmissions. The determination of whether HARQ feedback is needed may be based on other factors. Examples of other factors that may be evaluated include available HARQ feedback resources and the number of UE devices in the group. Where it is determined that HARQ feedback is appropriate, a PC5-RRC connection (unicast) is established and, where HARQ feedback is not appropriate, groupcast transmission is maintained. If groupcast transmission is maintained, no distance-based HARQ feedback is used by the receiving UE device until location information is available to the receiving UE device 102.

For the example of FIG. 5, the transmitting UE device 101, gNB, network, or any combination of the three, determine that HARQ feedback should be used and the PC5-RRC connection is established at event 506. In accordance with known techniques and messaging, the transmitting UE device 101 communicates with the receiving UE device to establish the unicast connection where HARQ feedback is used.

At event 508, the receiving UE device 102 is removed from the transmitting UE device's groupcast list. Communication continues using the unicast connection.

At transmission 510, a unicast transmission including the group data for the group is transmitted to the receiving UE device 102. At transmission 512, the receiving UE device transmits the appropriate HARQ feedback based on the HARQ configuration and the success of receiving the unicast transmission 510.

At event 514, the receiving UE device 102 determines that location information is available. In response, the receiving UE device 102 sends a location available indication to the transmitting UE device 101 at transmission 516. For the example, the receiving UE device 102 sends a message over the PC5-RRC link to the transmitting UE device 101.

Figure 6:
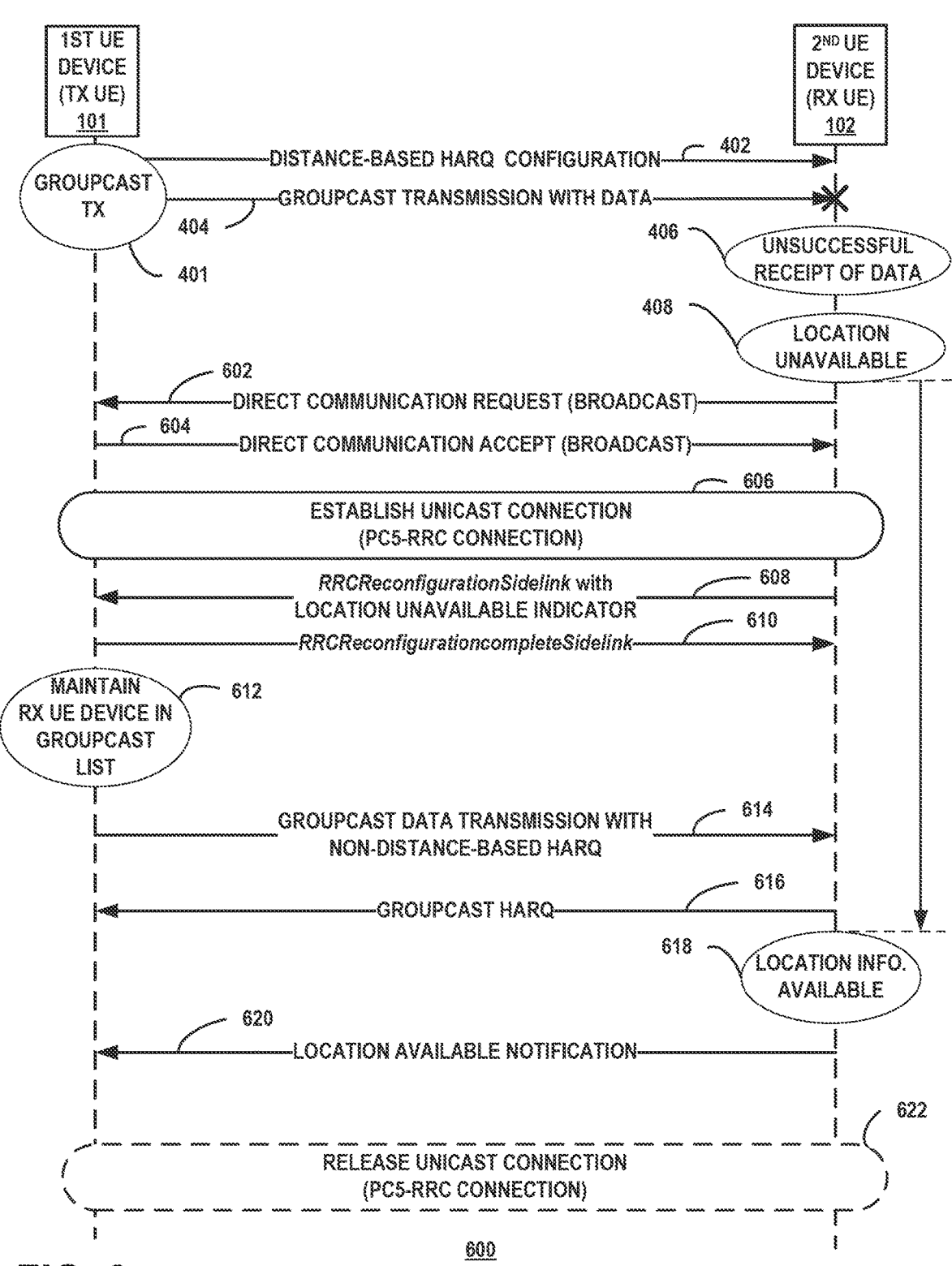
FIG. 6 is a message flow diagram for an example where a receiving UE device provides a location unavailable notification to a transmitting UE device 101 over a tempo-rary unicast connection.

FIG. 6 is a message flow diagram 600 for an example where a receiving UE device 102 provides a location unavailable notification 116 to a transmitting UE device 101 over a temporary unicast connection. The message flow discussed with reference to FIG. 6 is an example of the message flow discussed with reference to FIG. 4. Event 401, transmission 402, transmission 404, event 406 and event 408 are performed as discussed above with reference to FIG. 4.

At transmission 602, the receiving UE device 102 sends a Direct Communication Request message to the transmitting UE device 101. For the example, the Direct Communication Request message is transmitted over a broadcast channel in accordance with known techniques.

At transmission 604, the transmitting UE device 101 sends a Direct Communication Accept message to the receiving UE device 102. For the example, the Direct Communication Accept message is transmitted over a broadcast channel in accordance with known techniques.

At event 606, a PC5-RRC connection is established between the transmitting UE device 101 and the receiving UE device 102. Therefore, a unicast connection is established between the two devices 101, 102.

At transmission 608, a sidelink reconfiguration message with a location unavailable notification 116 is sent from the receiving UE device 102 to the transmitting device 101. For the example, an RRCReconfigurationSidelink message is sent by the receiving UE device 102 where the message includes a location unavailable indicator. In one example, the indicator is a new optional IE such as SL-HARQ-NotificationPC5 is added to the RRCReconfigurationSidelink message that includes the location unavailable indicator.

At transmission 610, an RRCReconfigurationcompletesidelink message is transmitted to the receiving UE device 102 to acknowledge the transmission 608. For the example, the RRCReconfigurationcompletesidelink message is transmitted in accordance with known techniques.

For the example, therefore, a unicast connection is established using broadcast signaling and the location unavailable notification is sent as an indicator is a control signal over a unicast sidelink connection. In some situations, the unicast connection may be established through one or more base stations. When utilizing such a Uu route, the transmissions are in accordance with known techniques for intra-gNB and inter-gNB services. The location unavailable notification or indicator may be part of the traffic data or it can be an RRC control signal (indicator)

At event 612, the transmitting UE device 101 determines that group data should be sent to the receiving UE device 102 using groupcast transmission and that groups HARQ should not be distance based. Accordingly, the transmitting UE device 101 maintains the receiving UE device 102 in the groupcast list.

At transmission 614, a groupcast data transmission is sent from the transmitting UE device 101 to the receiving UE device 102 where the transmission indicates that HARQ feedback that is not distance based should be used by the receiving UE device 102.

At transmission 616, the receiving UE device 102 transmits a HARQ message in accordance with the SCI information received in the groupcast data transmission. If groupcast ACK is enabled for the transmission 614, the groupcast HARQ may be an ACK. Otherwise, the transmission is only NACK when the data portion is not successfully received.

For the example, the receiving UE device 102 notifies the transmitting UE device 102 when location information becomes available to the receiving UE device 102. At event 618, the receiving UE device 102 determines that location information is available. At transmission 620, a location available notification is sent to transmitting UE device 101. For the example, the message is broadcast to the transmitting UE device.

At event 622, the unicast connection is released. For the example, the PC5-RRC connection can be released at any time after the location unavailable indicator is sent to the transmitting UE device.

Figure 7:
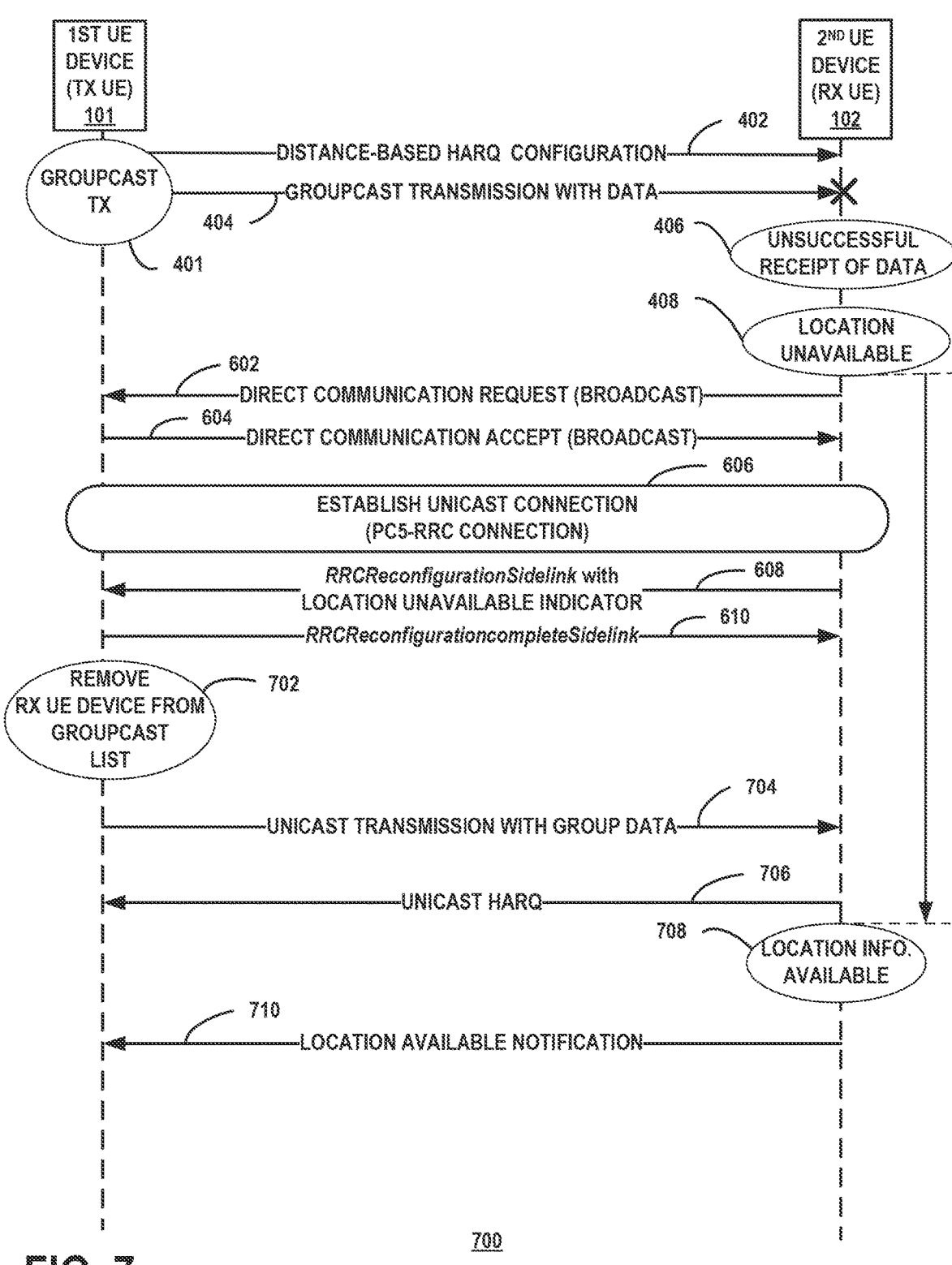
FIG. 7 is a message flow diagram for an example where a receiving UE device provides a location unavailable notification to a transmitting UE device over a unicast connection replacing the groupcast link.

FIG. 7 is a message flow diagram 700 for an example where a receiving UE device 102 provides a location unavailable notification 116 to a transmitting UE device 101 over a unicast connection replacing the groupcast link. The message flow discussed with reference to FIG. 7 is an example of the message flow discussed with reference to FIG. 4. Event 401, transmission 402, transmission 404, event 406 and event 408 are performed as discussed above with reference to FIG. 4. Transmission 602, transmission 604, event 606, transmission 608, and transmission 610, are performed as discussed above with reference to FIG. 6.

At event 702, the transmitting UE device 101 removes the receiving UE device from the groupcast list. Accordingly, the transmitting UE device 101 determines that all data associated with the group will be transmitted over the unicast link rather than in groupcast transmissions.

At transmission 704, the transmitting UE device sends group data to the receiving UE device 102 over the PC5-RRC link. The transmission 704 includes the HARQ feedback configuration.

At the transmission 706, the receiving UE device 102 transmits a HARQ message in accordance with the SCI information received in the unicast transmission. If ACK is enabled for the transmission 704, the groupcast HARQ may be an ACK. Otherwise, the transmission 706 is only NACK when the data portion is not successfully received.

For the example, the receiving UE device 102 notifies the transmitting UE device 102 when location information becomes available to the receiving UE device 102. At event 708, the receiving UE device 102 determines that location information is available. At transmission 710, a location available notification is sent to the transmitting UE device 101. For the example, the message is broadcast to the transmitting UE device.

Figure 8:
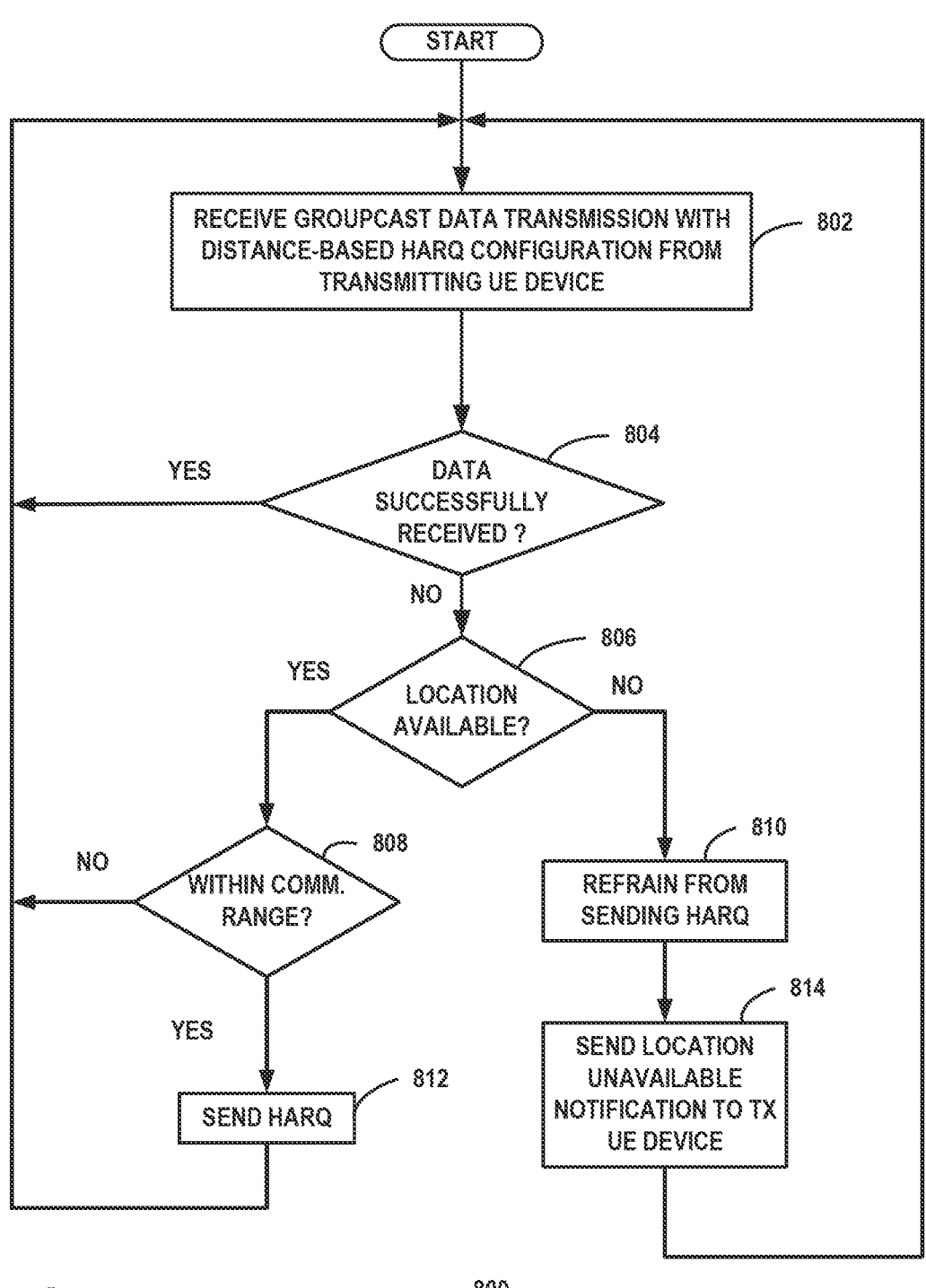
FIG. 8 is a flow chart of an example of a method of managing groupcast feedback based on location information availability.

FIG. 8 is a flow chart of an example of a method 800 of managing groupcast feedback based on location information availability. For the example, the method is performed by a UE device operating in a NR V2X system such as the system 100 described above. Accordingly, the method may be performed by the second UE device (receiving UE device) 102 when part of a group of the first UE device (transmitting UE device) 101.

At step 802, a groupcast data transmission with distance-based HARQ configuration is received. For the example, at least the SCI portion is successfully received. The data portion may not be successfully received at step 802.

At step 804, it is determined whether the data portion of the groupcast data transmission is successfully received. In accordance with known techniques receiving UE device 102 evaluates the information in the transmission to determine if the data has been successfully received. If the data is successfully received, the method returns to step 802 for reception of the next transmission. Otherwise, the method proceeds to step 806.

At step 806, it is determined whether location information is available. If the location of the receiving UE device 102 is known or can be determined, the method continues at step 808. Otherwise, the method proceeds to step 810.

At step 808, it is determined whether the receiving UE device 102 is within the distance range for sending HARQ feedback. The distance based on the criteria specified by the transmitting UE device is calculated and evaluated to determine if HARQ feedback is required. If the receiving UE device is not within the distance range, the method returns to step 802 to receive the next transmission without sending HARQ feedback. Otherwise, the HARQ feedback is transmitted at step 812. As discussed above, distance-based HARQ feedback includes only NACK for the example.

Accordingly, the receiving UE device 102 sends a NACK indicating that the data in the groupcast transmission was not successfully received before returning to step 802.

At step 810, the receiving UE device refrains from sending HARQ feedback. In some situations, step 810 is omitted and the receiving UE device sends the HARQ feedback even though location information is unavailable.

At step 814, a location unavailable notification is sent to the transmitting UE device. In some situation, a location unavailable indicator is sent in a broadcast message to the transmitting UE device 101. In other situations, a PC5-RRC connection is established and a location unavailable indicator transmitted over the unicast connection. As discussed herein, the PC5-RRC connection may be replacement of the groupcast link or may be a temporary link. Also, in some circumstances, a replacement unicast link may be established by the transmitting UE device 101 after receipt of the location unavailable notification via broadcast or unicast.

Figure 9:
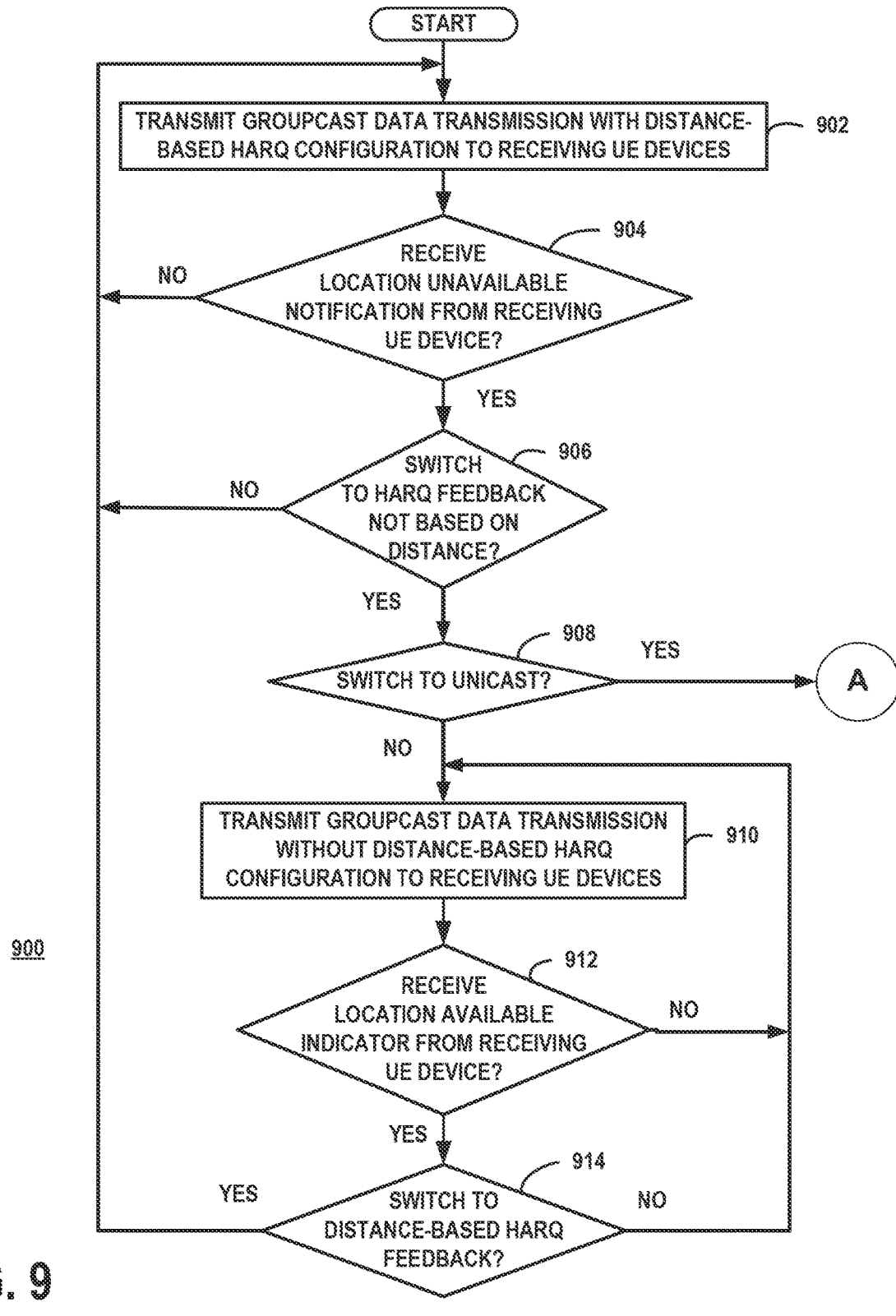
FIG. 9 is a flow chart of an example of a method of managing groupcast feedback based on location information availability.

FIG. 9 is a flow chart of an example of a method 900 of managing groupcast feedback based on location information availability. For the example, the method is performed by a UE device operating in a NR V2X system such as the system 100 described above. Accordingly, the method may be performed by the first UE device (transmitting UE device) 101 when transmitting groupcast transmission to a group of UE devices including the second UE device (receiving UE device) 102.

At step 902, a groupcast data transmission with distance-based HARQ configuration is transmitted to a group of UE device including the second UE device (receiving UE device 102. The groupcast data transmission includes distance-based HARQ feedback configuration.

At step 904, it is determined whether a location unavailable notification from a receiving UE device 102 has been received. In some situations, a location unavailable indicator is sent in a broadcast message from the receiving UE device 102. In other situations, a PC5-RRC connection is established and a location unavailable indicator is received over the unicast connection. As discussed herein, the PC5-RRC connection may be replacement of the groupcast link or may be a temporary link. Also, in some circumstances, a replacement unicast link may be established by the transmitting UE device 101 after receipt of the location unavailable notification via broadcast or unicast.

At step 906, it is determined whether the groupcast transmissions to the UE devices should be switched to HARQ feedback that is not based on distance. The transmitting UE device evaluates factors such as the QoS, number of UE devices in the group, and the available PSFCH resources. If it is determined that distance-based HARQ feedback should continue to be used, the method continues at step 902. Otherwise, the method proceeds to step 908 where it is determined if unicast should be used for the receiving UE device without location information.

At step 908, the transmitting UE device 101 evaluates factors such the QoS required for the receiving UE device, available resources and the number of UE devices in the group. If it is determined that unicast should be used, the method continues at point A discussed with reference to FIG. 10. Otherwise, the method proceeds to step 910 where data is transmitted in a groupcast transmission with a groupcast HARQ not based on distance configuration. For the example, therefore, it is determined whether groupcast HARQ not based on distance or unicast should be used for the next transmission. Steps 904, 906 and 908 may be performed in a different order than shown in FIG. 9. Also, steps 904, 906 and 908 may be performed as a single operation where the transmitting UE device 101 evaluates conditions and information and determines whether should be sent via groupcast or unicast and if sent via groupcast whether distance-based HARQ or non-distance-based HARQ should be used for feedback.

At step 910, the transmitting UE device 101 sends data to the receiving UE device 102 in a groupcast transmission without a distance-based HARQ configuration.

At step 912, it is determined whether a location available indicator has been received from the receiving UE device 102 that previously did not have location information. The location available indicator indicates that the receiving UE device 102 now has location information. If the location available indicator is not received, the method continues at step 910 where data is transmitted via groupcast without distance based HARQ. Otherwise, the method proceeds to step 914.

At step 914, it is determined whether distance-based HARQ should be used. The transmitting UE device 101 evaluates conditions such as required QoS of the next transmission, the number or UE devices in the group and available PSFCH resources. If it is determined that distance-based HARQ should be used, the method returns to step 902. Otherwise, the method returns to step 910.

In some situations, the decisions on whether to use unicast for data transmissions to a group member, or to use distance-based HARQ, or non-distance-based HARQ in groupcast transmissions are at least partially performed by a base station or the network. Accordingly, the transmitting UE device 101 may provide information to the serving base station and receive instructions on whether to use a particular transmission and feedback. Also, the base station may provide criteria or information that assists the transmitting UE device in determining which cast type and feedback to use.

Figure 10:
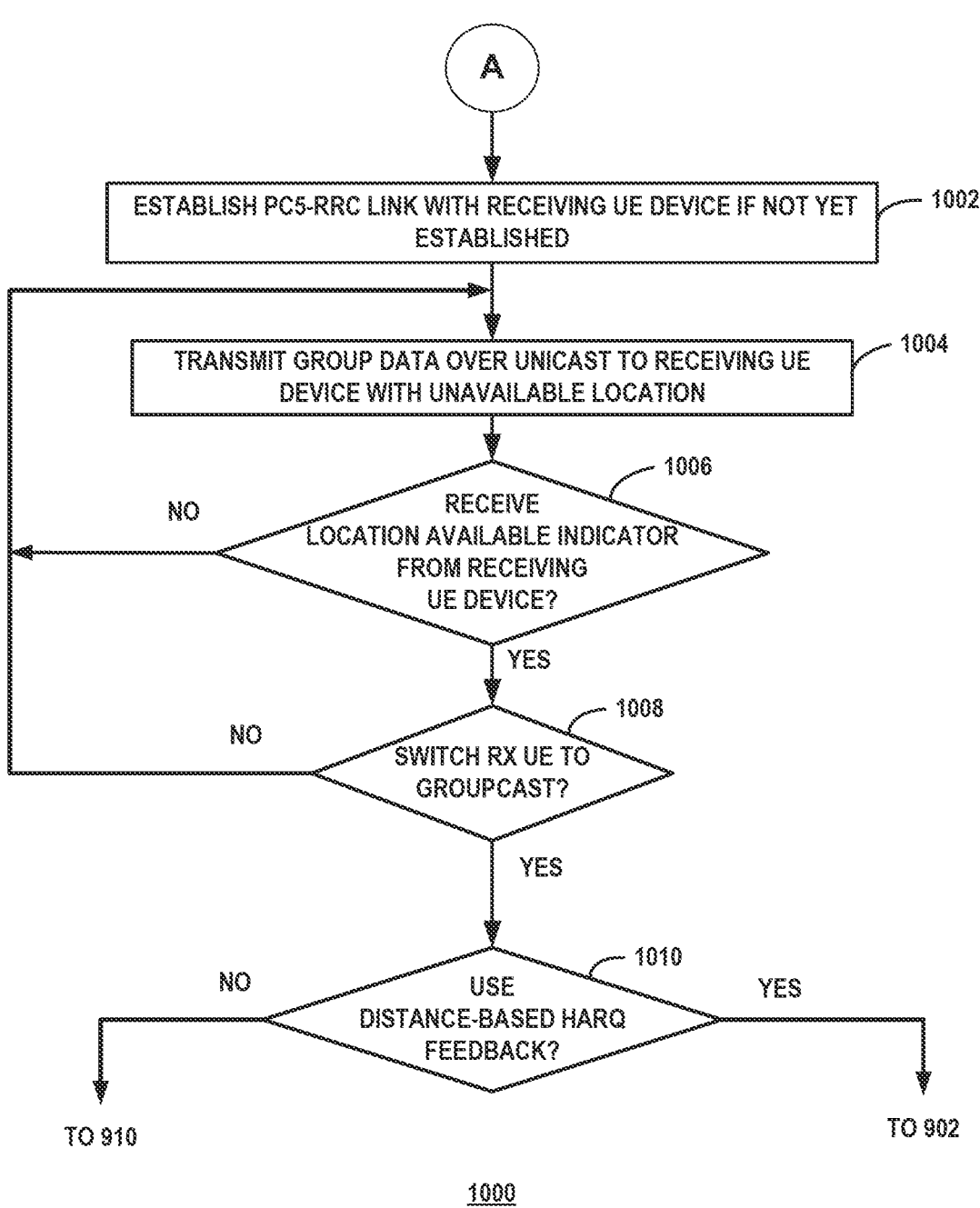
FIG. 10 is a flow chart of an example of a method of managing groupcast feedback based on location information availability continued from the method of FIG. 9 where it is determined that unicast should be used for the transmission.

FIG. 10 is a flow chart of an example of a method 1000 of managing groupcast feedback based on location information availability continued from the method of FIG. 9 where it is determined that unicast should be used for the transmission at step 908. Accordingly, the method continues at point A of FIG. 9.

At step 1002, a PC5-RRC communication link is established is the unicast link has not already been established with the received UE device 102. In accordance with known techniques messages are exchanged to establish the link.

At step 1004 the group data destined from the received UE device 102 is transmitted over the unicast link. Accordingly, the transmission has a HARQ feedback for unicast.

At step 1006, it is determined whether a location available indicator has been received from the receiving UE device 102 that previously did not have location information. The location available indicator indicates that the receiving UE device 102 now has location information. If the location available indicator is not received, the method continues at step 1006 where data is transmitted via unicast. Otherwise, the method proceeds to step 1008.

At step 1008, it is determined whether transmission to the received UE device 102 should be sent via groupcast. The transmitting UE device 101 evaluates conditions such as the required QoS of the next transmission, the number or UE devices in the group and available PSFCH resources. If it determined that groupcast should be used the method continues at step 1010. Otherwise, the method returns to step 1004 where unicast is used.

At step 1010, it is determined whether groupcast HARQ feedback should be based on distance. The transmission UE device 101 evaluates the conditions and information and determines whether distance-based HARQ should be used. If it is determined that distance-based HARQ should be used, the method returns to step 902. Otherwise, the method returns to step 910.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a receiving user equipment (UE) device, the method comprising:
  receiving a groupcast data transmission from a transmitting UE device, the groupcast data transmission comprising a distance-based hybrid automatic repeat request (HARQ) feedback configuration;
  determining that location information is unavailable;
  sending a location unavailable notification to the transmitting UE device indicating that location information is unavailable, the location unavailable notification indicating that the receiving UE device will not transmit HARQ feedback messages in response to groupcast transmissions with distance-based HARQ feedback configuration.

2. The method of claim 1, wherein the sending comprises:
  broadcasting a location unavailable notification message to the transmitting UE device.

3. The method of claim 1, wherein the sending comprises:
  establishing a unicast communication link with the transmitting UE device; and transmitting a location unavailable notification message to the transmitting UE device over the unicast communication link.

4. The method of claim 3, wherein the unicast communication link is temporary and is released after the location unavailable notification message is transmitted.

5. The method of claim 3, further comprising:
  receiving, from the transmitting UE device over the unicast communication link, a unicast transmission comprising group data for a group associated with the groupcast data transmission.

6. The method of claim 5, wherein the location unavailable message triggers, at the transmitting UE device, removal of the receiving UE device from a groupcast list designating the group receiving groupcast transmissions.

7. A receiving user equipment (UE) device comprising:
  a receiver configured to receive a groupcast data transmission from a transmitting UE device, the groupcast data transmission comprising a distance-based hybrid automatic repeat request (HARQ) feedback configuration;
  a controller configured to determine that location information is unavailable;
  a transmitter configured to send a location unavailable notification to the transmitting UE device indicating that location information is unavailable, the location unavailable notification indicating that the receiving UE device will not transmit HARQ feedback messages in response to groupcast transmissions with distance-based HARQ feedback configuration.

8. The receiving UE device of claim 7, wherein the transmitter is configured to broadcast a location unavailable notification message to the transmitting UE device.

9. The receiving UE device of claim 7, wherein the transmitter is configured to:
  transmit, to the transmitting UE device, a Direct Communication Request to initiate establishment of a unicast communication link between the transmitting UE device and the receiving UE device; and
  transmit a location unavailable notification message to the transmitting UE device over the unicast communication link.

10. The receiving UE device of claim 9, wherein the unicast communication link is temporary and is released after the location unavailable notification message is transmitted.

11. The receiving UE device of claim 9, wherein the receiver is configured to receive, from the transmitting UE device over the unicast communication link, a unicast transmission comprising group data for a group associated with the groupcast data transmission.

12. The receiving UE device of claim 11, wherein the location unavailable message triggers, at the transmitting UE device, removal of the receiving UE device from a groupcast list designating the group receiving groupcast transmissions.

13. A transmitting user equipment (UE) device comprising:
  a transmitter configured to transmit a groupcast data transmission to a group of UE devices, the groupcast data transmission comprising a distance-based hybrid automatic repeat request (HARQ) feedback configuration;
  a receiver configured to receive, from a receiving UE device of the group of UE devices, a location unavailable notification indicating that location information is unavailable to the receiving UE device and that the receiving UE device will not transmit HARQ feedback messages in response to groupcast transmissions with distance-based HARQ feedback configuration.

14. The transmitting UE device of claim 13, wherein the receiver is configured to receive a broadcast transmission comprising a location unavailable notification message from the receiving UE device.

15. The transmitting UE device of claim 13, wherein the receiver is configured to:
  receive, from the receiving UE device, a Direct Communication Request to initiate establishment of a unicast communication link between the transmitting UE device and the receiving UE device; and
  receive a location unavailable notification message from the receiving UE device over the unicast communication link.

16. The transmitting UE device of claim 15, wherein the unicast communication link is temporary and is released after the location unavailable notification message is transmitted.

17. The transmitting UE device of claim 15, wherein the transmitter is configured to transmit, to the receiving UE device over the unicast communication link, a unicast transmission comprising group data for the group of UE devices.

18. The transmitting UE device of claim 13, further comprising:
  a controller configured to select a HARQ feedback configuration for transmission to the receiving UE device of group data for the group of UE devices, the HARQ feedback configuration selected from a distance-based HARQ feedback and a HARQ feedback not based on distance, the transmitter configured to transmit another groupcast data transmission comprising the group data with the selected HARQ feedback configuration.

19. The transmitting UE device of claim 18, wherein the controller is configured to select the HARQ feedback configuration based on at least one of a required quality of service (QOS) of the transmission, a number of UE devices in the group of UE devices, and available Physical Sidelink Feedback Channel (PSFCH) resources.

20. The transmitting UE device of claim 13, further comprising:

a controller configured to select a cast type for transmission to the receiving UE device of group data for the group of UE devices, the cast type selected from unicast and groupcast, the transmitter configured to transmit another groupcast data transmission comprising the group data using the selected cast type.

21. The transmitting UE device of claim 20, wherein the controller is configured to select the cast type based on at least one of a required quality of service (QoS) of the transmission, a number of UE devices in the group of UE devices, and available Physical Sidelink Feedback Channel (PSFCH) resources.

22. The transmitting UE device of claim 21, wherein the controller is configured to, when unicast is selected, remove the receiving UE device from a groupcast list designating the group receiving groupcast transmissions.

\* \* \* \* \*